(12) United States Patent
Muijs et al.

(10) Patent No.: US 8,289,272 B2
(45) Date of Patent: Oct. 16, 2012

(54) CONTROL OF A DISPLAY

(75) Inventors: Remco Theodorus Johannes Muijs, Eindhoven (NL); Jan Stroemer, Eindhoven (NL); Bart Gerard Bernard Barenbrug, Eindhoven (NL)

(73) Assignee: TP Vision Holding B.V., Eindhoven (NL)

( * ) Notice: Subject to any disclaimer, the term of this patent is extended or adjusted under 35 U.S.C. 154(b) by 327 days.

(21) Appl. No.: 12/864,513

(22) PCT Filed: Jan. 22, 2009

(86) PCT No.: PCT/IB2009/050234
§ 371 (c)(1),
(2), (4) Date: Jul. 26, 2010

(87) PCT Pub. No.: WO2009/095819
PCT Pub. Date: Aug. 6, 2009

(65) Prior Publication Data
US 2010/0309298 A1 Dec. 9, 2010

(30) Foreign Application Priority Data

Jan. 30, 2008 (EP) .................................. 08150831

(51) Int. Cl.
*G09G 3/36* (2006.01)
(52) U.S. Cl. ........................................... 345/102
(58) Field of Classification Search .................. 345/102, 345/690; 348/59
See application file for complete search history.

(56) References Cited

U.S. PATENT DOCUMENTS

| | | | |
|---|---|---|---|
| 2002/0135553 A1* | 9/2002 | Nagai et al. .................... | 345/89 |
| 2003/0006952 A1 | 1/2003 | Hong | |
| 2005/0184952 A1 | 8/2005 | Konno et al. | |
| 2008/0259233 A1* | 10/2008 | Krijn et al. ...................... | 349/15 |
| 2008/0273005 A1* | 11/2008 | Chen et al. ..................... | 345/102 |

FOREIGN PATENT DOCUMENTS

| | | |
|---|---|---|
| EP | 1202244 A1 | 5/2002 |
| WO | 2007072330 A1 | 6/2007 |

OTHER PUBLICATIONS

Kim et al:"69.1: Invited Paper: Advancements for Highest—Performance LCD TV"; 2006 SID International Symposium, vol. XXXVII, May 2005, pp. 1938-1941.
Kimura et al: "60.2: Invited Paper:New Technologies for Large-Sized High-Quality LCD TV"; 2005 SID International Symposium, vol. XXXVI, May 2005. pp. 1734-1737.
Seetzen et al: "High Dynamic Range Display Systems"; ACM Transactions on Graphics, vol. 23, No. 3, pp. 760-768, 2004.

* cited by examiner

*Primary Examiner* — Jimmy H Nguyen
(74) *Attorney, Agent, or Firm* — Shimokaji & Assoc., PC

(57) ABSTRACT

A display control system (11) comprises an input (12) for receiving an image to be displayed by means of a backlight (2) and a transmissive panel (3). A backlight controller (5) provides different colors or luminances for causing the backlight (2) to sequentially apply the different colors or luminances to the transmissive panel (3) in time-sequential sub-fields of the image. A transmissive panel controller (6) provides transmittivities for causing the transmissive panel (3) to sequentially apply the transmittivities to the transmissive panel in the time-sequential sub-fields of the image for displaying the image. The transmissive panel controller (6) selects a transmittivity based on a predetermined amount of off-axis gamma distortion of the transmissive panel.

15 Claims, 9 Drawing Sheets

CONTROL OF A DISPLAY

FIELD OF THE INVENTION

The invention relates to control of a display.

BACKGROUND OF THE INVENTION

LCD displays are generally known to have a somewhat deteriorated performance when viewed under oblique viewing angles. This may result in perceived reduced contrast or incorrect color rendering when the display is viewed from such an oblique viewing angle. In many cases, this effect is most pronounced for low to mid-range luminance levels. Another weakness of LCD displays is their limited contrast due to residual light leakage when the panel is displaying dark luminance values. This latter shortcoming can be partially alleviated by recent advances in backlight technology. The advent of LED technology offers the prospect of designing locally addressable backlight units with which light can be generated exclusively in those areas where the light is needed to properly portray the video content. In dark areas of a scene, the backlight can be dimmed, resulting in a higher contrast and a lower power consumption. This is discussed in "High Dynamic Range Display Systems" by H. Seetzen et al., ACM Trans. Graph. 23, 3, pp. 760-768, 2004. To correctly depict video content on a display with a dimmable backlight, the panel drive values should be compensated for the backlight modulation. In other words, when the backlight intensity is reduced by a factor d, the panel transmittance of the overlying pixels should be increased by a corresponding factor to ensure that the pixels are displayed at the desired intensities. However, the panel compensation is imperfect.

SUMMARY OF THE INVENTION

It would be advantageous to have an improved display control system. To better address this concern, in a first aspect of the invention a display control system is presented that comprises
 an input for receiving an image to be displayed by means of a backlight and a transmissive panel;
 a backlight modulation controller for providing a first drive signal to the backlight, the first drive signal representing at least two different colors or luminances for causing the backlight to sequentially apply the at least two different colors or luminances to at least a portion of the transmissive panel in at least two time-sequential sub-fields of the image; and
 a transmissive panel controller for providing a second drive signal to the transmissive panel, the second drive signal representing at least two transmittivities for causing the transmissive panel to sequentially apply the at least two transmittivities to at least a pixel of the portion of the transmissive panel in the at least two time-sequential sub-fields of the image, wherein the transmissive panel controller comprises means for selecting the transmittivities based on a content of the image and based on the colors or luminances of the first drive signal to display the image, wherein a remaining freedom in the selection of the transmittivities is used for selecting transmittivities having a reduced off-axis gamma distortion.

The transmissive properties of the panel, in combination with the intensity and color produced by the backlight, determine what is visible on the display. Consequently, the transmittivity of the transmissive panel and the backlight output have to be coordinated: if the backlight is dimmed, the panel has to become more transparent in order to obtain the same effective luminance. If the backlight output has a particular color, the transmittivity of the transmissive panel with respect to different colors may be adjusted similarly to obtain a desired display color and/or luminance. Some transmittivity parameter values are associated with undesirable qualities, for example viewing artifacts such as off-axis gamma distortion, whereas other transmittivity parameters are associated with desirable qualities, for example high image quality or a low off-axis gamma distortion. Off-axis gamma distortion can be quantified in several ways, e.g. a transmission value difference (0 versus 45 degrees) of a specific grey driving value (e.g. there where the curves differ the most), or a sum over several transmission differences. The use of at least two different luminances in the backlight for at least two sequential sub-fields allows more freedom in selecting panel transmittivities compared to for example the situation where at least two transmittivities are used in combination with the same backlight luminance. Consequently, the use of at least two different luminances for at least two sequential sub-fields of an image rendering allows the transmissive display to make more use of the transmittivities having the desirable qualities. Reversely, the transmissive display needs to make less use of transmittivities having the undesirable qualities. Consequently, the overall image quality is improved. In particular the image quality with respect to oblique viewing angles may be improved. The off-axis gamma distortion may depend on a difference between a perceived color or luminance when viewing the display from an orthogonal viewing direction compared to a perceived color or luminance when viewing the display from an oblique viewing direction. This difference may be reduced by embodiments of the invention.

The backlight controller may comprise means for selecting the colors or luminances based on the content of the image and based on expected selected transmittivities by the means for selecting the transmittivities, wherein a freedom in the selection of the colors or luminances is used to select colors or luminances corresponding to expected selected transmittivities having a reduced off-axis gamma distortion. This way, use is made of transmittivities having an even further reduced off-axis gamma distortion, which results in a further increase in image quality.

The means for selecting the colors or luminances may be arranged for selecting at least one of the colors or luminances corresponding to an expected selected transmittivity that is a maximum transmittivity of the at least one pixel. In many displays, in particular liquid crystal displays, the off-axis gamma distortion is relatively low around the maximum transmittivity. This property may be used to reduce off-axis gamma distortion by selecting the backlight colors or luminances such that the maximum transmittivity may be applied by the transmissive panel.

The backlight controller may comprise means for incorporating in the first drive signal respective groups of at least two luminances to be applied by the backlight to respective portions of the transmissive panel during the at least two time-sequential sub-fields, and wherein the backlight controller further comprises means for selecting the groups of luminances in dependence on local image content of the image. This allows to apply the techniques presented also to displays having a locally dimmable backlight. It further reduces visibility of the backlight's light source pattern due to different transmittivity parameter values used in combination with different light sources, in particular under oblique viewing angles.

Further aspects of the invention are disclosed in the independent claims. The dependent claims define advantageous embodiments.

BRIEF DESCRIPTION OF THE DRAWINGS

These and other aspects of the invention will be further elucidated and described with reference to the drawing, in which.

DETAILED DESCRIPTION OF EMBODIMENTS

Herein, inter alia, a method is described to improve the viewing angle (VA) characteristics of LCD panels based on adaptive backlight driving. Low- and mid-grey tones, that are typically prone to viewing angle deficiencies, may be displayed in two or more successive sub-fields using LCD panel values that produce a more consistent image when the display is viewed from different viewing angles. The backlight intensity may be modulated over the individual sub-frames depending on the video content. This backlight modulation enables a wider choice of possible panel drive value combinations which may be used to obtain a better performance, for example in terms of VA improvement. The method may be combined with local backlight dimming and local backlight boosting techniques. Such techniques have been used for LCD displays having a high dynamic range. Suitable values for the desired backlight intensity and a suitable distribution of the desired backlight intensity over the sub-fields may be established on the basis of local analysis of the incoming video content. A local content-adaptive method may be used for improving contrast and/or viewing angle. Such a method preferably allows the off-axis visibility of the backlight structure in locally dimmable display systems to be reduced.

Figure 2:
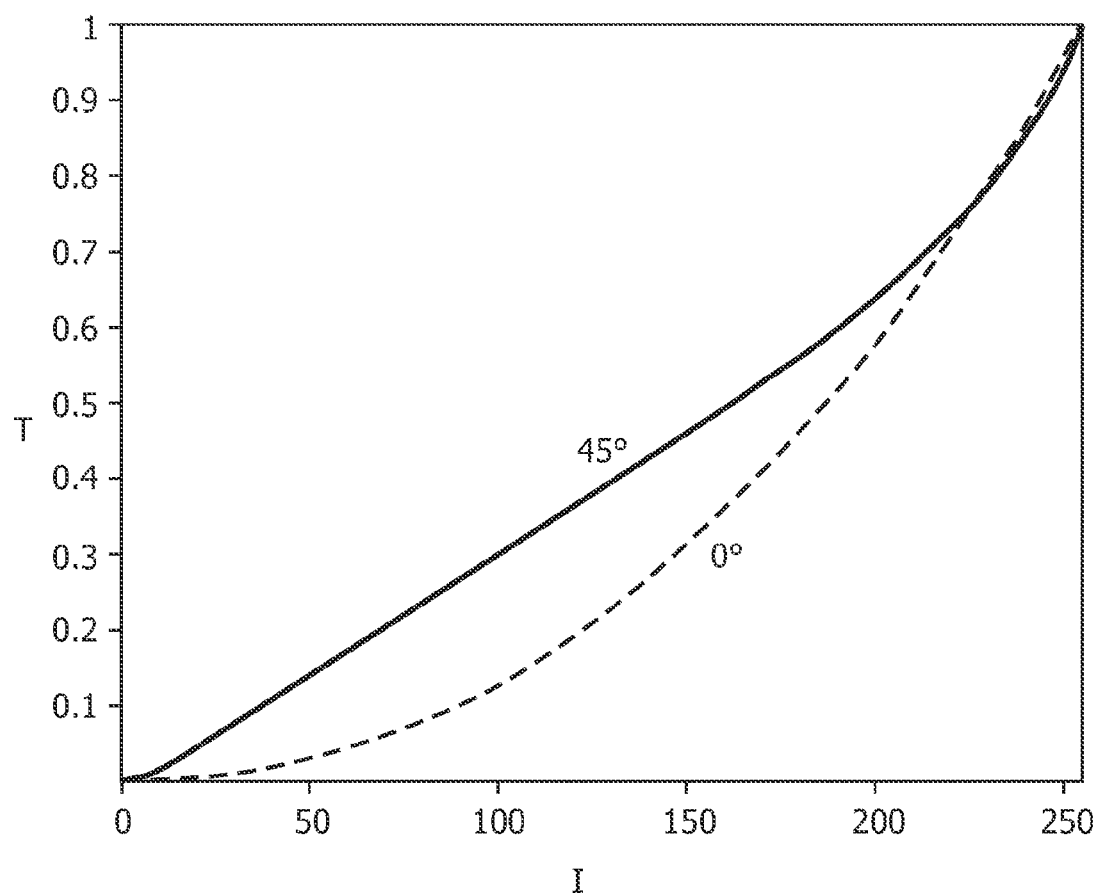
FIG. 2 is a graph containing gamma curves at different viewing angles.

LCD displays are generally known to have a somewhat deteriorated performance under oblique viewing angles, which may result in reduced contrast or incorrect color rendering. This may reduce the joy in using the display. The variation with viewing angle is often most pronounced when displaying low grey levels to mid grey levels. This is illustrated in FIG. 2, which shows an example gamma curve of a VA-type LCD panel for a grey ramp measured for viewing angles of 0° and 45° in the horizontal plane. The gamma curve describes the relation between input drive level (I) and transmittivity (T) in arbitrary units. In this example, for panel drive values higher than 220, the on-axis and off-axis panel transmittance are nearly identical. For lower drive values, however, the panel transmittance is considerably higher under a horizontal angle of 45° and the gamma curve is nearly linear, resulting in a washed out appearance of the image. FIG. 2 demonstrates that the highest absolute errors occur for mid-grey levels, whereas the relative error is large for relatively low grey tones. However this graph is only an illustrative example of characteristics of a particular test display. Other displays may have other gamma curves and other grey levels with large off-axis gamma distortion.

LCD displays may show residual light leakage when the panel is in the closed state. This shortcoming can be partially alleviated by adaptive backlight technology. The advent of LED technology offers the prospect of designing locally addressable backlight units with which light can be generated exclusively in those areas where it is needed to properly portray the video content. In dark areas of a scene, the backlight can be dimmed, which may result in a higher contrast and lower power consumption.

To correctly depict video content on a display with a dimmable backlight, the panel drive values should be compensated for the backlight modulation. In other words, when the backlight intensity is reduced by a factor d, the panel transmittance of the overlying pixels should be increased by the same factor to ensure that the pixels are displayed at the desired intensities. However, when the panel compensation is imperfect, the backlight modulation may become visible in the front-of-screen appearance of the scene. As panel compensation is usually optimized for on-axis performance, the backlight modulation may be more visible when looking at such displays under oblique angles. Such visibility of backlight modulation may result in the appearance of halo artifacts around bright objects.

If the backlight is capable of producing light in different colors, the at least two different sub-fields may have different colors and/or luminances. Sub-pixels of the transmissive panel may be adjusted for each time-sequential sub-field in accordance with the produced color of the backlight. In the following, the invention is described in detail for the case where the backlight luminance varies over the sub-fields. However, it will be understood that this is only a non-limiting example.

Figure 1A:
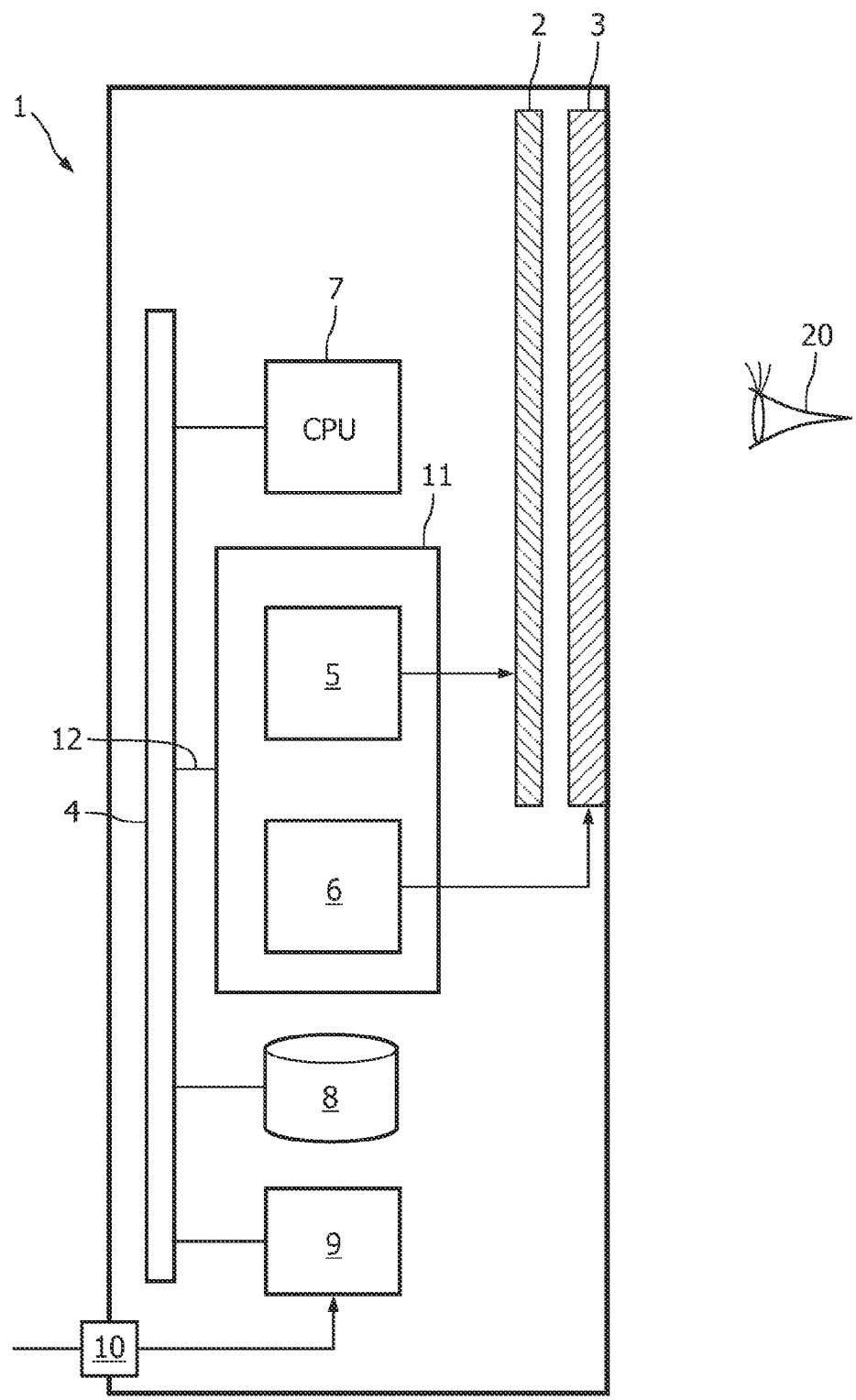
FIG. 1A illustrates a diagram of a display.

FIG. 1A illustrates an embodiment of a display 1. The display 1 may be a standalone display, such as a computer monitor, or may be part of a device, such as a television, mobile viewer, e.g. mobile phone, personal digital assistant (PDA), or the like. The components shown are exemplary only. Embodiments using different electronic components or having a different architecture may be used. Also, the components shown may have more functionality than just what is described here in relation to the invention. For example, CPU 7 may be the CPU of a PDA and as such be responsible for operating the functionality of the PDA as well as for controlling the display electronics. The display 1 comprises a backlight 2 and a transmissive panel 3 in front of the backlight. The backlight is controlled by a backlight controller 5 and the transmissive display is controlled by a transmissive panel controller 6. The backlight controller 5 and the transmissive panel controller 6 are part of a display control system 11. The backlight controller 5 and the transmissive panel controller 6 may be combined in a module that provides the functionality of both. The display 1 further comprises an input 9 for obtaining an image or a video signal via a connector 10. The video signal comprises a sequence of images to be rendered. The input may accept any kind of analog or digital signals via connector 10. Although not shown, the input 9 may be arranged to receive signals wirelessly, for example via WLAN or DVB-T, instead of via the connector 10. The connector 10 may be compliant with any one or more of DVI, HDMI, coax, SD card, USB, although other protocols are not excluded. A CPU 7 may be provided for controlling the several components, and a volatile and/or non-volatile memory 8 may be provided for storing content locally for later rendering. The components 5-9 may be connected for example via a communication bus 4.

The backlight 2 is arranged for sequentially applying at least two different luminance values for at least two sequential sub-fields of an image rendering. The transmissive panel 3 is arranged for cooperating with the backlight by adjusting a transmittivity parameter of at least a portion of the transmissive panel for rendering an obtained image. The controllers 5, 6 and the other components shown may be used to implement this arrangement, but other architectures are equally possible.

Figure 1B:
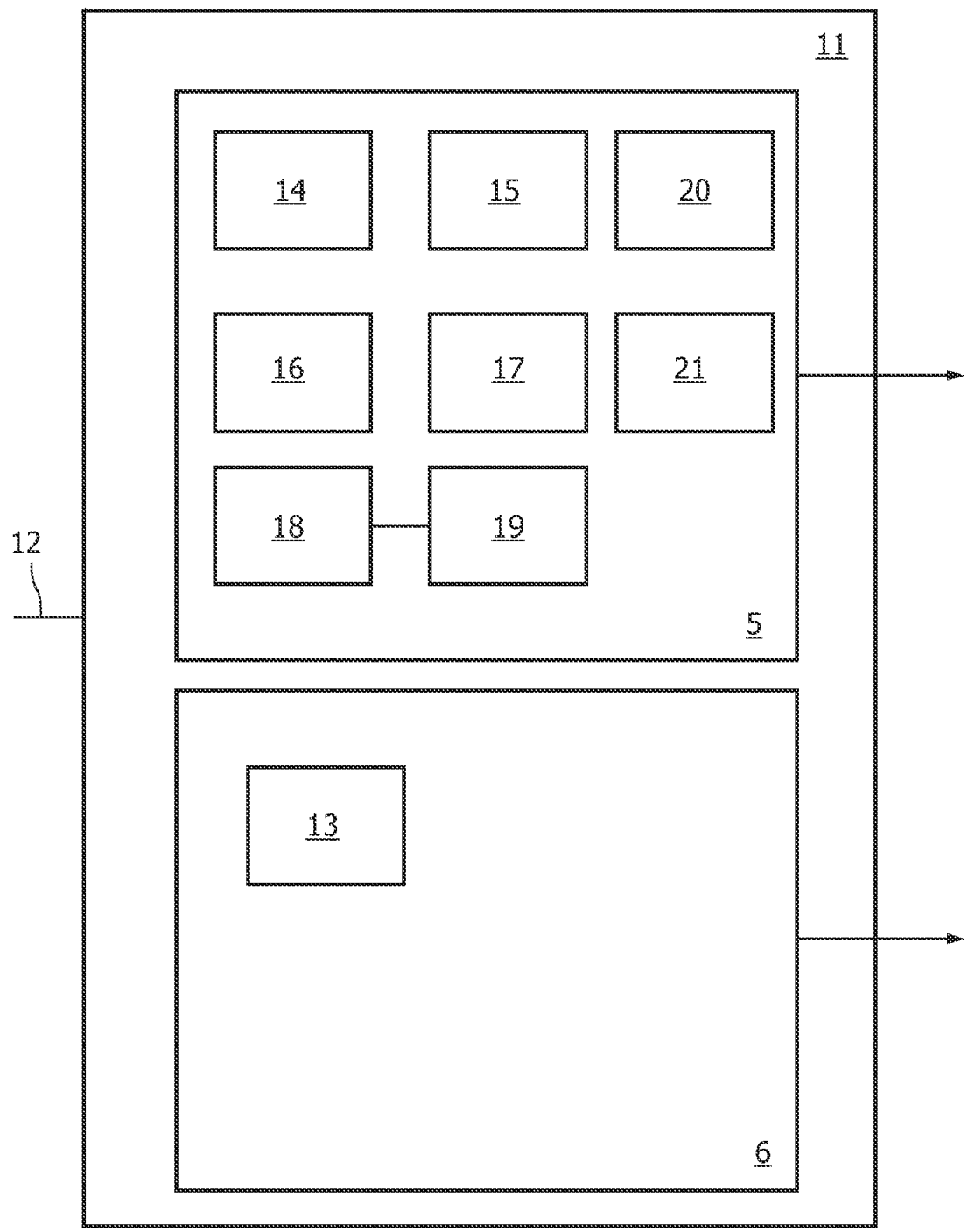
FIG. 1B illustrates a diagram of a display control system.

FIG. 1B illustrates the display control system 11 in more detail. The same reference numerals have been used for similar objects.

The transmissive panel controller 6 comprises means 13 for selecting at least one transmittivity of the at least two transmittivities based on a predetermined amount of off-axis gamma distortion of the transmissive panel for the at least one transmittivity. This means may be implemented by means of a look-up table, for example. The means 13 preferably selects the transmittivities to be applied by the transmissive panel 3 such that the transmittivity parameter values having a relatively low off-axis gamma distortion are used as much as possible. To this end, the two sequential sub-fields are assigned different transmittivities, under the constraint that the total luminance perceived for any pixel of the display 3 by a viewer 20 corresponds to the image that is rendered.

The backlight controller 5 comprises means 14 for selecting the at least two colors or luminances corresponding to selected transmittivities for displaying the image, wherein at least one of the transmittivities is selected based on a predetermined amount of off-axis gamma distortion of the transmissive panel for the at least one of the transmittivities. Preferably, at least one of the applied luminances allows the transmissive panel to apply at least one transmittivity parameter value in a predetermined set of desirable transmittivity parameter values. The backlight controller 5 thus takes into account the possible transmittivity parameter values that the transmissive display 3 can use to render a particular portion of the image. The backlight controller 5 adjusts the backlight luminance such that the transmissive display 3 can use the transmittivity parameter values having a high desirability (these desirable transmittivity parameter values may be for example the near-uppermost and/or near-lowermost ranges of transmittivity supported by the panel). A look-up table may be used to efficiently look up luminance values belonging to characteristics of the predetermined image (such as pixel values).

The desirability of a transmittivity value may depend on an associated gamma distortion for an oblique viewing angle. For many transmissive panels, the gamma distortion for oblique viewing angles is larger for some transmittivities values than for other transmittivities. The off-axis gamma distortion may be determined at least in part by a difference between a perceived color or luminance when viewing the display from an orthogonal viewing direction compared to a perceived color or luminance when viewing the display from an oblique viewing direction.

The backlight 2 may comprise means for locally applying respective groups of at least two luminance values to respective portions of the transmissive panel during the at least two time-sequential sub-fields. The backlight controller 5 may comprise means 15 for incorporating in the first drive signal respective groups of at least two luminances to be applied by the backlight to respective portions of the transmissive panel during the at least two time-sequential sub-fields. The backlight controller 5 further may comprise means 16 for selecting the groups of luminances in dependence on local image content of the image. These portions to which luminance is applied may correspond to respective ones of a plurality of light sources that may be independently dimmable or controllable in the backlight. The backlight controller may be arranged for controlling the groups of local luminance values in dependence on local image content of the image. This helps to reduce and preferably avoid any visibility of backlight light source patterns under any viewing angles. These light source patterns may become visible under certain viewing angles, in particular when similar colors are occurring in neighboring image portions served by differently dimmed backlight light sources.

Means 17 may be provided for controlling separate luminances for different color components of the backlight. This applies in particular to backlights of which not only the overall luminance is controllable, but also the color. By controlling the color, one in effect may control the luminance of different color components. Controllable color components may include red, green and blue, although other color component configurations are possible. The backlight may be arranged for applying for each color component at least two sequential luminance values.

An embodiment comprises at least one look-up table 18 mapping respective values relating to image content to respective values relating to the luminance values. The backlight controller comprises means 19 for applying the look-up table to look up a value relating to a luminance value corresponding to a value representative of image content in at least a portion of the image.

In an embodiment, the backlight controller 5 comprises histogram means 20 for selecting the at least two luminance values in dependence on a histogram of values relating to image content in at least a portion of the image. For example, the histogram means 20 may be arranged for selecting a luminance value corresponding to a histogram bin having a largest value.

In an embodiment, the backlight controller 5 comprises means 21 for selecting a second luminance value based on a difference between a maximum luminance appearing in at least a portion of the image and a luminance corresponding to a first luminance value. This allows the total luminance of two sub-frames to correspond with the maximum luminance appearing in the portion of the image. This way, the total luminance of the backlight is minimized, which results in saving of energy and/or improved image contrast.

A display may comprise display control system 11, a backlight 2, and a transmissive panel 3. Such a display may be part of a television. Such a display may also be built into a personal digital assistant (PDA) or mobile phone.

In an embodiment, a 3D display is provided comprising the display control system 11, a backlight 2, a transmissive panel 704, and means 604 for spatial interleaving of pixels contributing to different ones of at least two stereoscopic views. In such a 3D display, the means for spatial interleaving may comprise slanted lenticulars 702.

As illustrated in FIG. 2, the most prominent viewing angle distortion may occur when displaying low to mid grey tones. Therefore, several viewing angle improvement techniques involve circumventing these drive levels by splitting the input pixel in two or more contributions with more extreme panel drive levels, i.e., panel drive levels that do not produce much viewing angle distortion. Such a split can be achieved either in the spatial domain by distributing the input (sub-)pixel over multiple sub-pixels or in the temporal domain by generating the desired luminance and color in a series of temporal sub-fields. These techniques may be tuned for optimal rendering of specific colors, such as skin tones. However they are not dynamically adapted to the characteristics of the incoming video content.

Recently, methods of dynamic backlight dimming have been considered for improving the dynamic range of the display and for reducing power consumption. However, the backlight dimming has influence on the LCD panel drive values to be used. Consequently, it is possible to adjust backlight dimming for allowing the panel to use panel drive levels that produce less viewing angle distortion.

When distributing the input (sub-)pixel over multiple sub-pixels or in the temporal domain by generating the desired luminance and color in a series of temporal sub-fields, the average transmitted light output over the sub-fields should be equal to that of the original video. When the backlight intensity is equal for all sub-fields, this condition can be expressed as:

$$T_{or} = \frac{1}{N_f} \sum_{i=1}^{N_f} T_i, \quad (1)$$

where $T_{or}$ denotes the original panel transmittance (without distributing over sub-fields), $T_i$ denotes the panel transmittance of sub-field i, and $N_f$ denotes the number of sub-fields. For simplicity, we assume that $N_f=2$ in the remainder of this document, but the invention is not limited to this case. Any number of sub-fields $N_f \geq 2$ may be used.

Figure 3A:
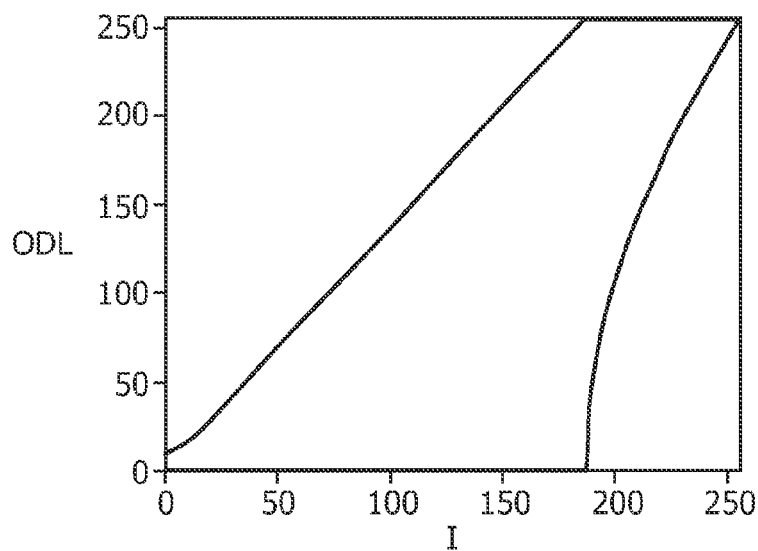
FIG. 3 illustrates transfer curves mapping input panel drive levels to output panel drive levels in case of equal backlight luminance values in the sub-fields.
Figure 3B:
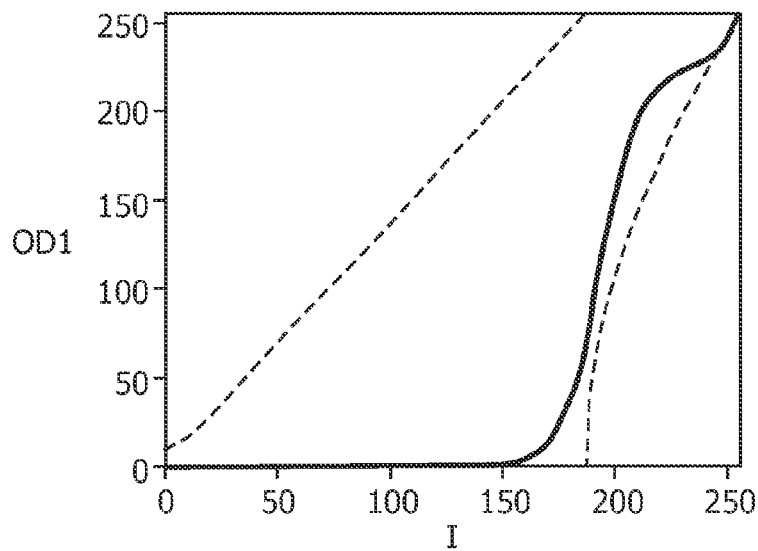
Figure 3C:
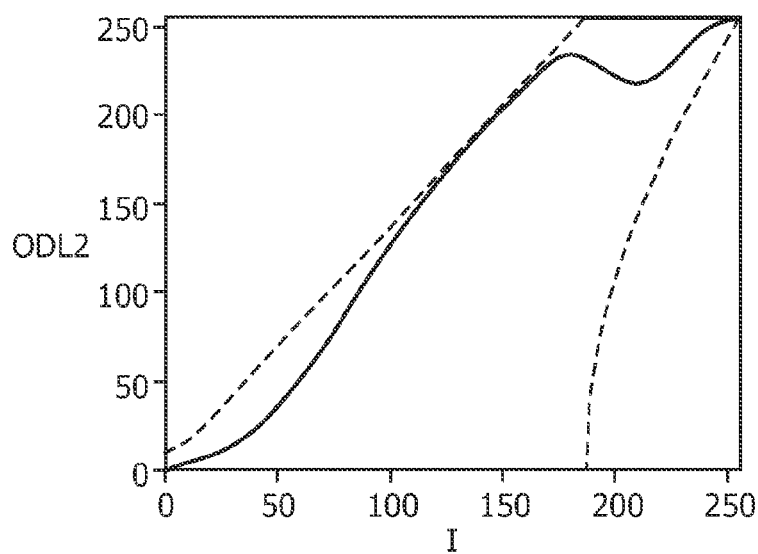

FIGS. 3B and 3C illustrate examples of transfer curves mapping an input drive level (I) to output drive levels for the first sub-field (ODL1) and for the second sub-field (ODL2). FIG. 3A shows an example of a solution space for a particular display, i.e., the range within which both sub-field output levels (ODL) are selected such that the average output luminance of the two sub-fields is substantially the same as the original luminance corresponding to the input drive level (I). Note that in the absence of backlight modulation, the boundaries for the allowable transfer curves of the two fields are identical. The exemplary transfer curves in FIGS. 3B and 3C show the output drive values representing the strategy of replacing input pixels by pairs of drive levels for the temporal sub-fields with more extreme (closer to 0 and 255) values. These figures are based on the situation in which the backlight is full on ($B_1=B_2=255$) in both sub-fields using the panel characteristic displayed in FIG. 2. The transfer curves (ODL1 and ODL2) have been selected such that they jointly satisfy the condition of equation (1). Because the backlight intensity is constant, the boundaries for the allowable transfer curves of the two fields are identical (as shown in FIG. 3A). The example transfer curves for field 1 and field 2 (ODL1 and ODL2) were determined by means of least-squares minimization of the off-axis luminance error using the panel characteristics shown in FIG. 2.

When the backlight intensity is different in the different sub-fields, the transfer curves preferably are adapted such that the condition that the average light output over the sub-fields is equal to that of the input is still satisfied. This can be expressed as:

$$B_{or}T_{or} = \frac{1}{N_f} \sum_{i=1}^{N_f} B_i T_i, \quad (2)$$

where $B_{or}$ denotes the original backlight intensity and $B_i$ denotes the backlight intensity of the ith sub-field. It is immediately evident from equation (2) that there is a close connection between the backlight drive values in the sub-fields and the allowable LCD drive values. By appropriately distributing the backlight intensity over the individual sub-fields, it is possible to use combinations of panel drive values that are more effective, for example in terms of viewing angle improvement.

Figure 4A:
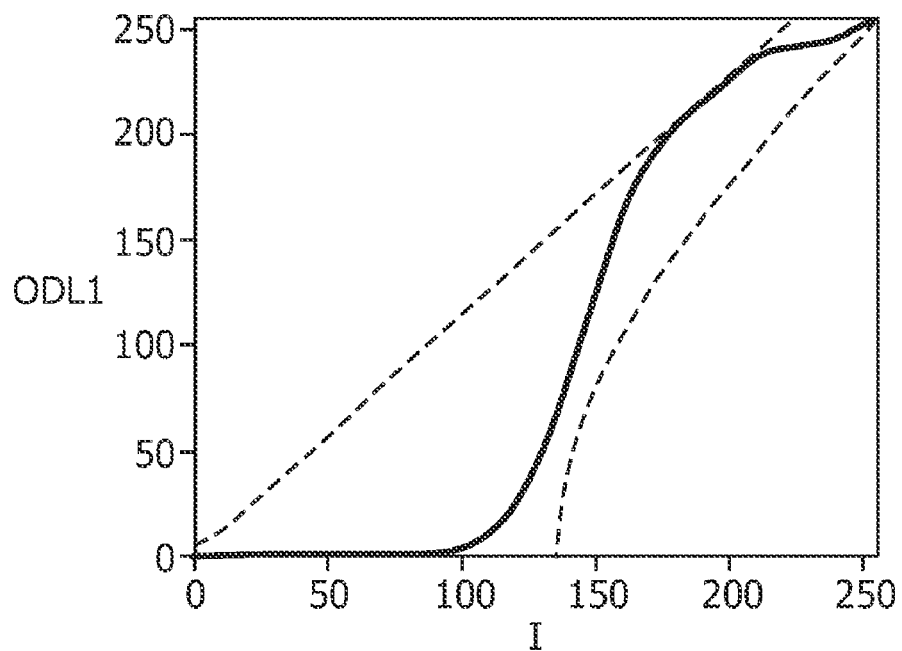
FIG. 4 illustrates transfer curves mapping input panel drive levels to output panel drive levels in case of different backlight luminance values in the sub-fields.
Figure 4B:
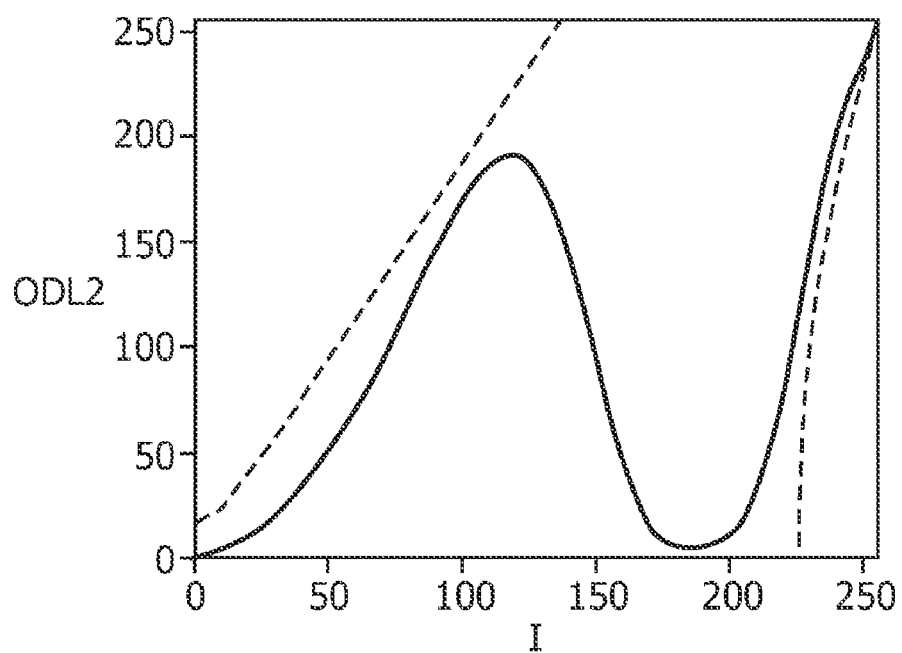

This is illustrated in FIG. 4, which demonstrates a situation where the backlight intensity is boosted by 50% ($B_1=382$) in the first field (FIG. 4A) and dimmed by 50% ($B_2=128$) in the second field (FIG. 4B). The associated solution space for the first and second fields are indicated by dashed curves in the FIGS. 4A and 4B. The panel transfer curve for the first field (ODL1) should lie between the dashed curves of FIG. 4A and the panel transfer curve for the second field (ODL2) should lie between the dashed curves of FIG. 4B. It is noted that the boundaries for the allowable transfer curves of the two fields are not the same, because of the modulation of the backlight intensity. It is evident from these Figures that, by using backlight modulation, combinations of panel drive values have become possible that could not be achieved in the constant backlight scenario. As a result, the LCD panel can be driven at different, more extreme drive levels in the two sub-fields, resulting in an improvement of viewing angle characteristics. FIGS. 4A and 4B, in turn, show suggested transfer curves for the first and second sub-field, respectively, based on least-squares minimization of the off-axis luminance error using the panel characteristics shown in FIG. 1A. On average, the off-axis image distortion may be reduced by 33% by using these transfer curves in the display panel tested to create the graph of FIG. 2.

In the above examples, the characteristics of the video content were not taken into account. Rather, the backlight intensities for the two sub-fields were set to two different, but fixed values. The effectiveness may be increased further by establishing the backlight intensities for the sub-fields by analyzing the image content. Such analysis may be based on histogram information, or for example dominant color information. This allows the backlight color and/or luminance to be adapted to the colors and/or luminances appearing in the image. The backlight may then be driven such that the LCD panel drive values are in a desirable range for those colors that are important for the image that is rendered.

To take it a step further, local image content may be taken into account, in particular if the backlight can be controlled locally to provide light with different luminances and/or colors locally. First, 2D-dimming algorithms may be applied to establish the total required light output $B_{or}$ and optionally the associated panel transmittances $T_{or}$. Then, the backlight intensity may be distributed over the available sub-fields in such a manner that the largest gain in terms of viewing angle characteristics can be achieved. For example, this is achieved when one or several of the backlight intensities are chosen in correspondence with a peak in the local histogram or with a dominant color. Also, some colors that are known to be particularly important, such as for example skin colors, may be given more weight in the histogram calculation than other, less important colors.

FIG. 5 illustrates a way of using local image content, in particular local histogram information. FIG. 5A shows a sketch of an image to be used as input. A local area 502 is analyzed to be able to control the backlight in this area. FIG. 5B shows the histogram of input drive values of the LCD panel in the area 502 in the gamma domain, for a fixed backlight. In this and other histograms, F denotes the frequency of a drive value (I) in at least a portion of an image. FIG. 5C shows the histogram of the image in the area 502 in the linear luminance domain. To ensure that sufficient light is generated to properly display the input image, the total backlight intensity $B_{or}$ may be determined by the highest pixel value in either domain (FIG. 5B or 5C). This depends on the 2D-dimming algorithm employed. In this case it amounts to 150 in the luminance domain (FIG. 5C). Next, this total required luminance may be distributed over two or more suitable backlight drive levels for the sub-fields. Given the high number of input pixels with drive levels around 35 in the linear luminance domain, it may be advantageous to choose the backlight intensity of the first field such that the image quality (e.g. the off-axis gamma distortion) is good for these drive levels around 35. For example, the backlight luminance is set to this level of 35, because in that case, the luminance levels around 35 can be realized by setting the LCD panel's transmittivity in the first sub-field to about the maximum value and in the second sub-field to about zero, which are favorable values with respect to off-axis viewing characteristics. In other words, the pixel values around 35 can be generated by letting the panel be (nearly) completely open in one field and nearly completely closed in the other. To ensure that sufficient light is generated, the average intensity over the sub-fields should be at least $B_{or}$. Preferably the average intensity is also not much more than $B_{or}$. This results in the following backlight intensities for this specific example: $B_1=2*35=70$, $B_1=2*(150-35)=230$. (The factor 2 stems from the fact that the effective duration of each drive value is halved because of the two sub-fields).

Figure 5A:
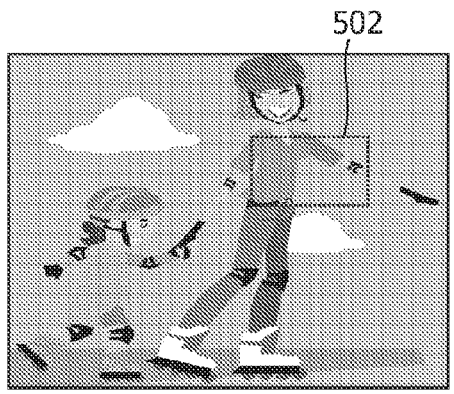
FIG. 5 shows histograms of panel drive values before and after introducing time-sequential sub-fields with different backlight intensities.
Figure 5B:
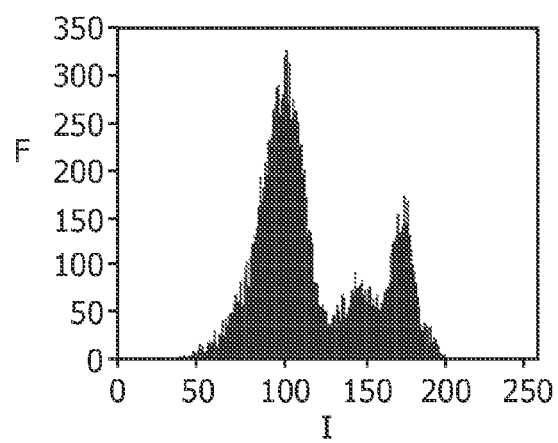
Figure 5C:
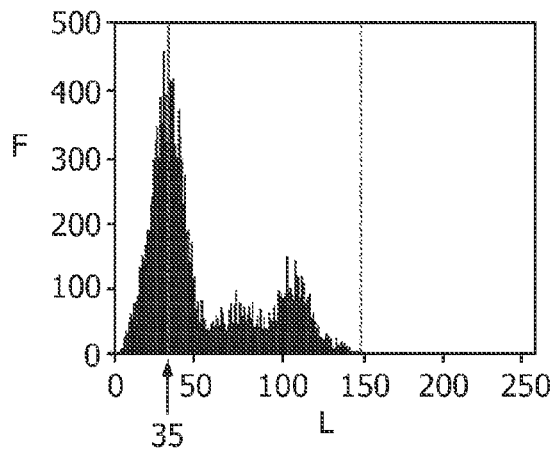
Figure 5D:
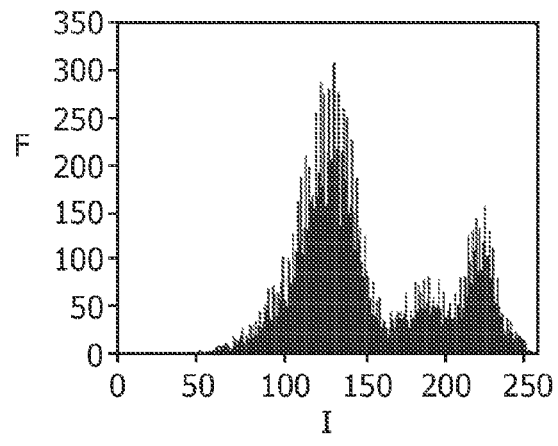
Figure 5E:
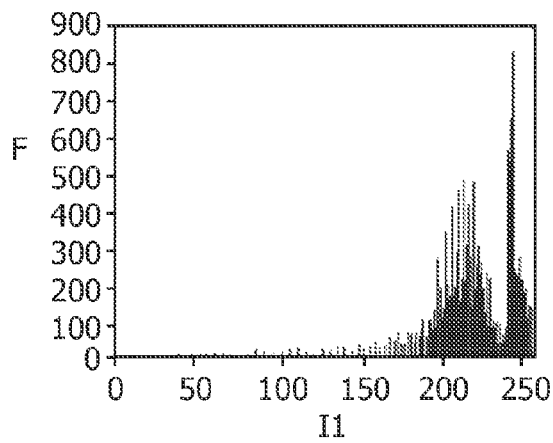
Figure 5F:
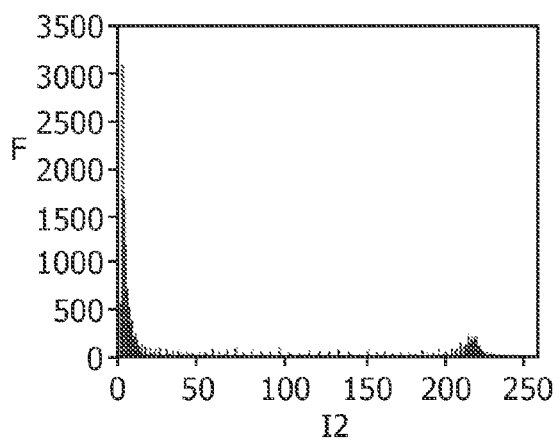

When the backlight is dimmed, the panel is compensated for the backlight modulation to ensure that the pixels are displayed at the desired intensities. FIG. 5D shows the LCD drive levels after application of the dimming compensation prior to splitting the signal in two sub-fields, i.e. dimming to a single backlight value wherein the luminance of the backlight corresponds to the maximum pixel value in the image region 502, which amounts to 150 in FIG. 5C. Due to the backlight dimming, the LCD drive values are increased and the highest pixel in the area under consideration is mapped to the maximum panel drive level of 255. FIGS. 5E and 5F show the histograms of LCD panel drive values for sub-fields 1 and 2, respectively, after application of the appropriate transfer curves (comparable to those shown in FIG. 4) to the input drive values. After the split over two temporal sub-fields, These histograms illustrate that after the temporal split, drive values are highly concentrated at the extreme ends of the scale for which the viewing angle characteristics of the panel are much better (D>200 and D<5). In an embodiment, a 3D display is provided comprising the display control system 11, a backlight 2, a transmissive panel 704, and means 604 for spatial interleaving of pixels contributing to different ones of at least two stereoscopic views. In such a 3D display, the means for spatial interleaving may comprise slanted lenticulars 702.

Figure 6:
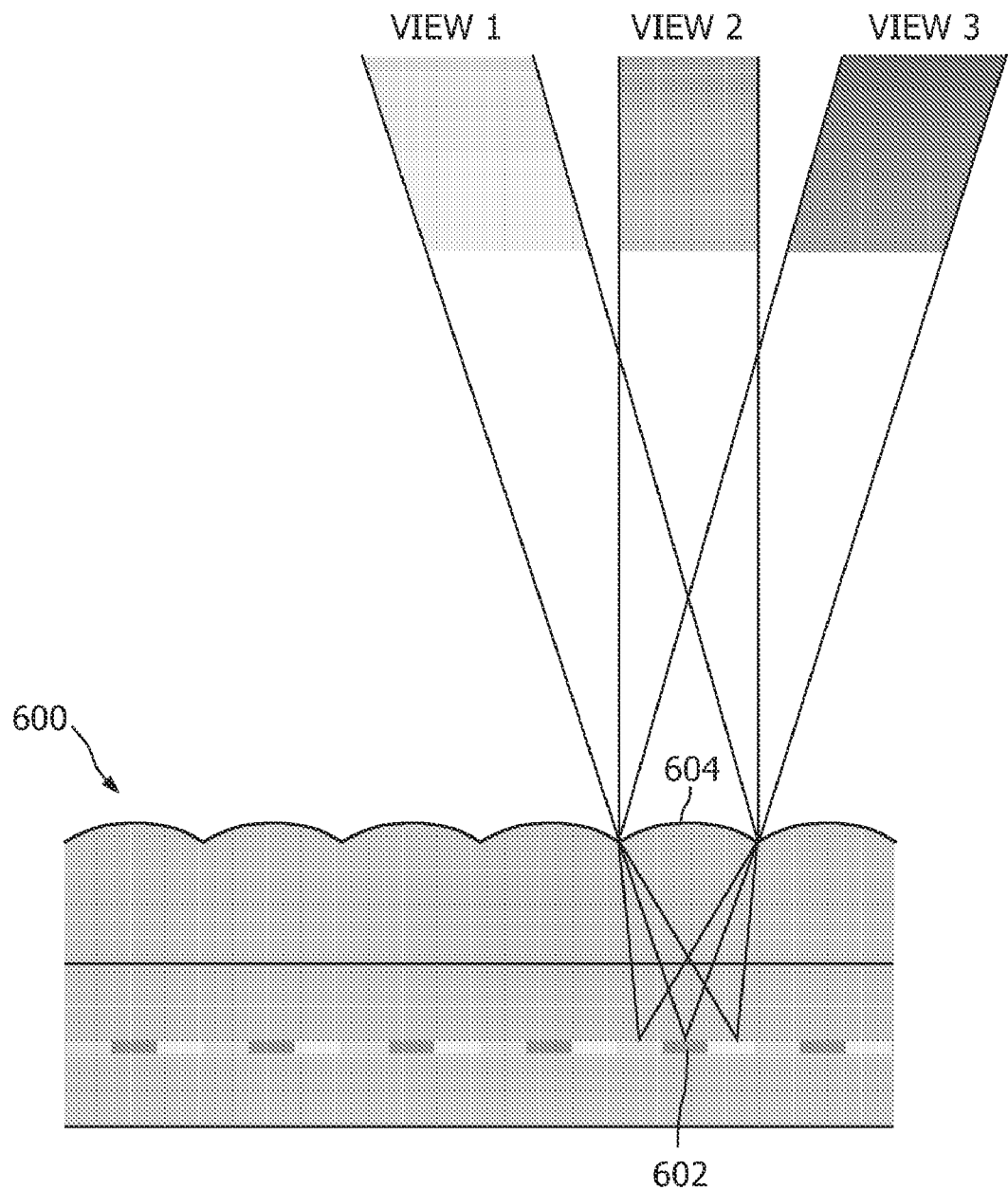
FIG. 6 shows a diagram of a cross-sectional view of a lenticular 3D display.

FIG. 6 shows a diagram of a cross-sectional view of a 3D display. Such a 3D display works by sending different views of the same scene (as seen from different angles) into different directions, so that someone who watches sees a different view with his left eye and right eye. FIG. 6 shows LCD sub-pixels 602 with a lenticular (cylindrical) lens 604 on top. Such lenticulars can make a 3D display out of a 2D one: the positive lens 604 focuses the light of pixels or sub-pixels 602 below it in different directions, depending on the position of the pixel under the lens.

Figure 7:
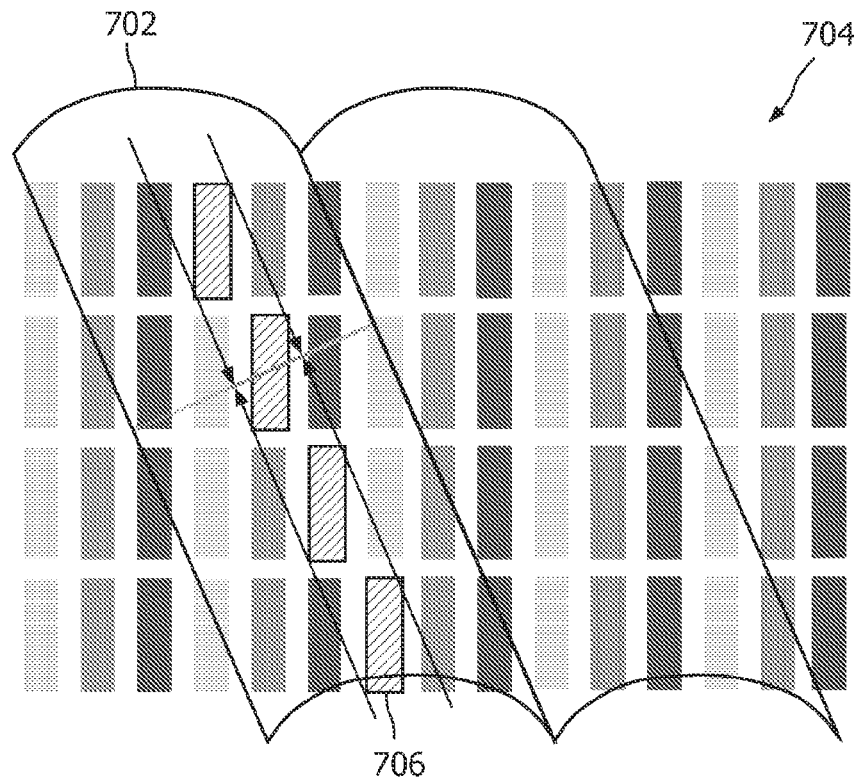
FIG. 7 shows a diagram of a front view of a slanted lenticular 3D display.

FIG. 7 shows a front view of a 3D display. The figure shows that the lenticular 702 is usually mounted under an angle (slant) with respect to the underlying pixel grid arrangement 704. Using this slant it is, among others, possible to use the horizontal and vertical resolution evenly to contribute to the resulting 3D resolution. As shown in FIG. 6, the position under the lens (perpendicular to the cylindrical axis of the lenticular) determines the direction into which pixels send their light. For example, the shaded pixels 706 send their light out into the same direction.

Figure 8:
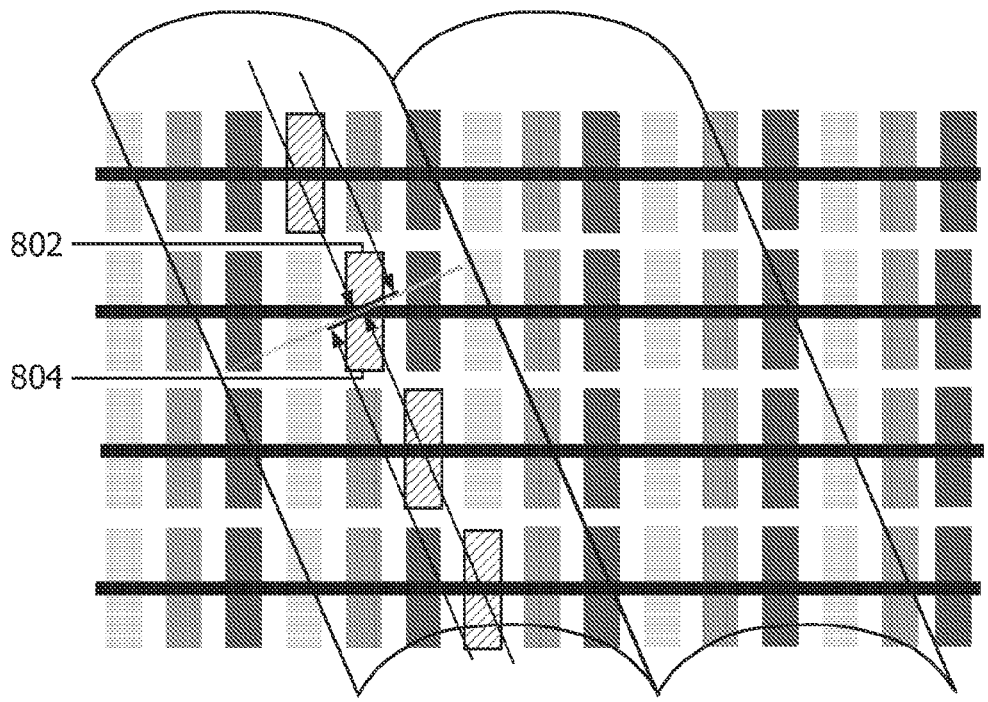
FIG. 8 shows a diagram of a front view of another slanted lenticular 3D display.

In FIG. 8, the pixels are split into pixel halves as a method to provide viewing angle improvement by setting each pixel half to a different intensity selected such that the gamma curve is better. On a 2D display the eye integrates the total intensity of the two pixel halves, and an improved gamma behavior under oblique viewing angles can be obtained. However, when applying a (slanted) lenticular, the two pixel halves do not project their light into the same direction. As illustrated in FIG. 8, the light from the top pixel half 802 will be focused more towards the left than the bottom pixel half 804, because the pixel is located more to the right under the lens. Therefore a viewer does not integrate the two intensities properly. In other words, wrong intensities are being projected into the directions from which a viewer might observe the screen.

Consequently, spatial application of integration of two intensities of the two pixel halves does not combine well with the spatial interleaving of views as used for 3D displays. If the two intensities are shown in a time-sequential manner in two time-sequential sub-frames however, the configuration of FIG. 7 can be maintained. Consequently the two intensities are projected into exactly the same direction by a 3D display, so that a viewer nicely integrates the intensities. This allows the image quality of a 3D display to be improved, in particular for oblique viewing angles.

The methods and techniques disclosed herein substantially improve the efficiency of viewing angle improvement techniques by allowing the backlight intensity to be modulated between the sub-fields, such that more extreme panel drive values can be used. Moreover, local histogram analysis may be employed to establish optimal backlight intensities for the sub-fields. The latter characteristic allows the backlight to be driven in such a manner that the largest gain in terms of viewing angle improvement can be realized for the pixels in the area under consideration. The methods described allow the visibility of the backlight structure in 2D-dimmable systems, which may originate from viewing angle deficiencies, to be reduced. As such, it is particularly suitable for high-end LCD TVs with local dimmable LED backlight functionality. The fast switching times of LEDs facilitate the creation of short sub-fields with different intensities.

Figure 9:
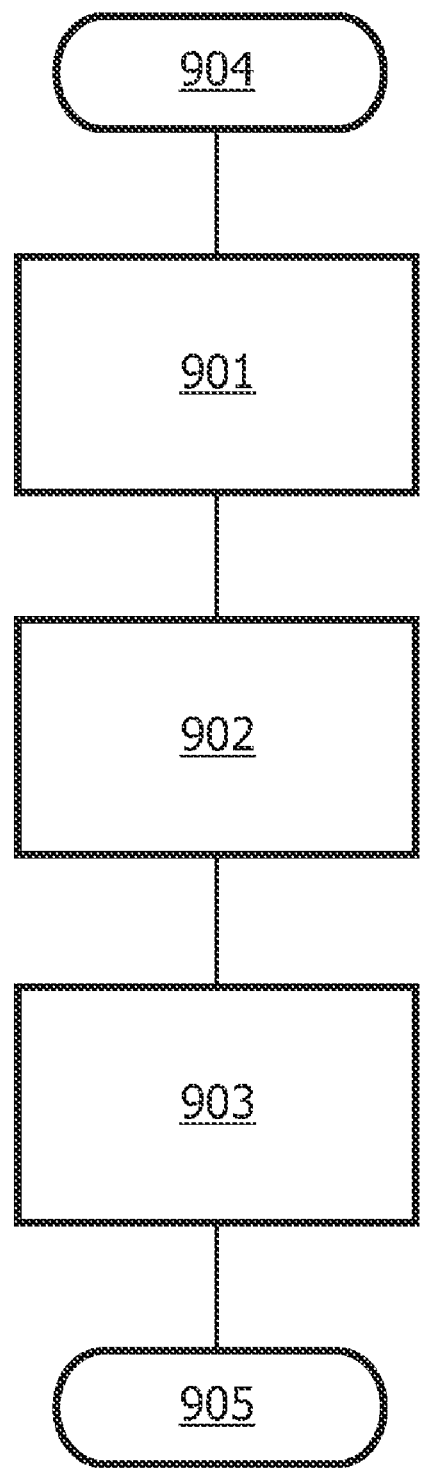
FIG. 9 illustrates processing steps in a process for displaying an image.

FIG. 9 illustrates processing steps of a method of displaying an image. The process begins at step 904. In step 901, an image is received. The image is to be displayed by means of a backlight and a transmissive panel. In step 902, a first drive signal is provided. The first drive signal represents at least two different colors or luminances for causing the backlight to sequentially apply the at least two different colors or luminances to at least a portion of the transmissive panel in at least two time-sequential sub-fields of the image. In step 903, a second drive signal is provided. The second drive signal represents at least two transmittivities for causing the transmissive panel to sequentially apply the at least two transmittivities to at least a pixel of the portion of the transmissive panel in the at least two time-sequential sub-fields of the image for displaying the image. The process terminates at 905. The process may be repeated for any image to be displayed, for example for a sequence of images comprised in a video signal.

It will be understood that the viewing angle improvement techniques described herein may be applied in all kinds of display systems, such as LCD-TVs, computer monitors, laptops, mobile phones, PDA's, 3D displays, etc.

Several further embodiments of the display control system are e.g.:

a display control system wherein the backlight controller comprises means for providing separate luminances for separate color components of the backlight, a display control system wherein the transmissive panel controller is arranged for controlling a transmissive panel comprising a pixel having a plurality of sub-pixels associated with differently colored transmission filters, a display control system comprising at least one look-up table mapping respective values relating to image content to respective values relating to the colors or luminances, wherein the backlight controller comprises means for applying the look-up table to look up a value relating to a luminance value corresponding to a value representative of image content in at least a portion of the image, a display control system wherein the backlight controller histogram means is arranged for selecting a color or luminance corresponding to a histogram bin having a largest value, a display control system wherein the backlight controller comprises means for selecting a second luminance based on a difference between a maximum luminance appearing in at least a portion of the image and a luminance corresponding to a first luminance value.

It will be appreciated that the invention also extends to computer programs, in particular control software for displays, and particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A display control system (11) comprising
   an input (12) for receiving an image to be displayed by means of a backlight (2) and a transmissive panel (3);
   a backlight controller (5) for providing a first drive signal to the backlight, the first drive signal representing at least two different colors or luminances for causing the backlight (2) to sequentially apply the at least two different colors or luminances to at least a portion of the transmissive panel (3) in at least two time-sequential sub-fields of the image; and
   a transmissive panel controller (6) for providing a second drive signal to the transmissive panel, the second drive signal representing at least two transmittivities for causing the transmissive panel (3) to sequentially apply the at least two transmittivities to at least a pixel of the portion of the transmissive panel in the at least two time-sequential sub-fields of the image, wherein the transmissive panel controller (6) comprises means (13) for selecting the transmittivities based on a content of the image and based on the colors or luminances of the first drive signal to display the image, wherein a remaining freedom in the selection of the transmittivities is used for selecting transmittivities having a reduced off-axis gamma distortion.

2. The display control system according to claim 1, wherein the off-axis gamma distortion depends on a difference between a perceived color or luminance when viewing the display from an orthogonal viewing direction compared to a perceived color or luminance when viewing the display from an oblique viewing direction.

3. The display control system according to claim 1, wherein the backlight controller (5) comprises means (14) for selecting the colors or luminances based on the content of the image and based on expected selected transmittivities by the means for selecting the transmittivities, wherein a freedom in the selection of the colors or luminances is used to select colors or luminances corresponding to expected selected transmittivities having a reduced off-axis gamma distortion.

4. The display control system according to claim 3, wherein the means (14) for selecting the colors or luminances is arranged for selecting at least one of the colors or luminances corresponding to an expected selected transmittivity that is a substantially maximum transmittivity of the at least one pixel.

5. The display control system according to claim 3, wherein the backlight controller (5) comprises histogram means (20) for selecting the at least two colors or luminances in dependence on a histogram of values relating to image content in at least a portion of the image.

6. The display control system according to claim 1, wherein the backlight controller (5) comprises means (15) for incorporating in the first drive signal respective groups of at least two luminances to be applied by the backlight to respective portions of the transmissive panel during the at least two time-sequential sub-fields, and wherein the backlight controller (5) further comprises means (16) for selecting the groups of luminances in dependence on local image content of the image.

7. A display (1) comprising a display control system (11) according to claim 1, a transmissive panel (3), and a backlight (2) for illuminating the transmissive panel.

8. A television comprising a display control system (11) according to claim 1, a transmissive panel (3), and a backlight (2) for illuminating the transmissive panel.

9. A mobile viewer comprising a display control system (11) according to claim 1, a transmissive panel (3), and a backlight (2) for illuminating the transmissive panel.

10. A 3D display comprising a display control system (11) according to claim 1, a backlight (2), a transmissive panel (704), and means (604) for spatial interleaving of pixels contributing to different ones of at least two stereoscopic views.

11. The 3D display according to claim 10, wherein the means for spatial interleaving comprises slanted lenticulars (702).

12. A method of controlling a display, comprising
receiving (901) an image to be displayed by means of a backlight (2) and a transmissive panel (3);
providing (902) a first drive signal to the backlight, the first drive signal representing at least two different colors or luminances for causing the backlight (2) to sequentially apply the at least two different colors or luminances to at least a portion of the transmissive panel (3) in at least two time-sequential sub-fields of the image; and
providing (903) a second drive signal to the transmissive panel, the second drive signal representing at least two transmittivities for causing the transmissive panel (3) to sequentially apply the at least two transmittivities to at least a pixel of the portion of the transmissive panel in the at least two time-sequential sub-fields of the image, wherein the step of providing (903) the second drive signal comprises a step of selecting the transmittivities based on a content of the image and based on the colors or luminances of the first drive signal to display the image, wherein a remaining freedom in the selection of the transmittivities is used for selecting transmittivities having a reduced off-axis gamma distortion.

13. The method according to claim 12, wherein the off-axis gamma distortion comprises a difference between a perceived color or luminance when viewing the display from an orthogonal viewing direction compared to a perceived color or luminance when viewing the display from an oblique viewing direction.

14. The method according to claim 12, wherein the step of providing (902) the first drive signal comprises selecting the colors or luminances based on the content of the image and based on expected selected transmittivities by said step of selecting the transmittivities, wherein a freedom in the selection of the colors or luminances is used to select colors or luminances corresponding to expected selected transmittivities having a reduced off-axis gamma distortion.

15. A non-transitory computer-readable storage medium comprising a computer program product comprising instructions for causing a processor to perform the method according to claim 12.

* * * * *